July 16, 1957 J. P. MORRELL 2,799,417

POWER DRIVEN MATERIAL HANDLING TRUCK WITH STACKING MECHANISM

Filed Oct. 30, 1956 9 Sheets-Sheet 1

INVENTOR.
JOHN P. MORRELL
BY Harry H. Hitzeman
ATTORNEY

July 16, 1957 J. P. MORRELL 2,799,417

POWER DRIVEN MATERIAL HANDLING TRUCK WITH STACKING MECHANISM

Filed Oct. 30, 1956 9 Sheets-Sheet 2

INVENTOR.
JOHN P. MORRELL
BY Harry H. Hitzeman
ATTORNEY.

INVENTOR.
JOHN P. MORRELL
BY
Harry H. Hitzeman
ATTORNEY.

FIG. 5-A.
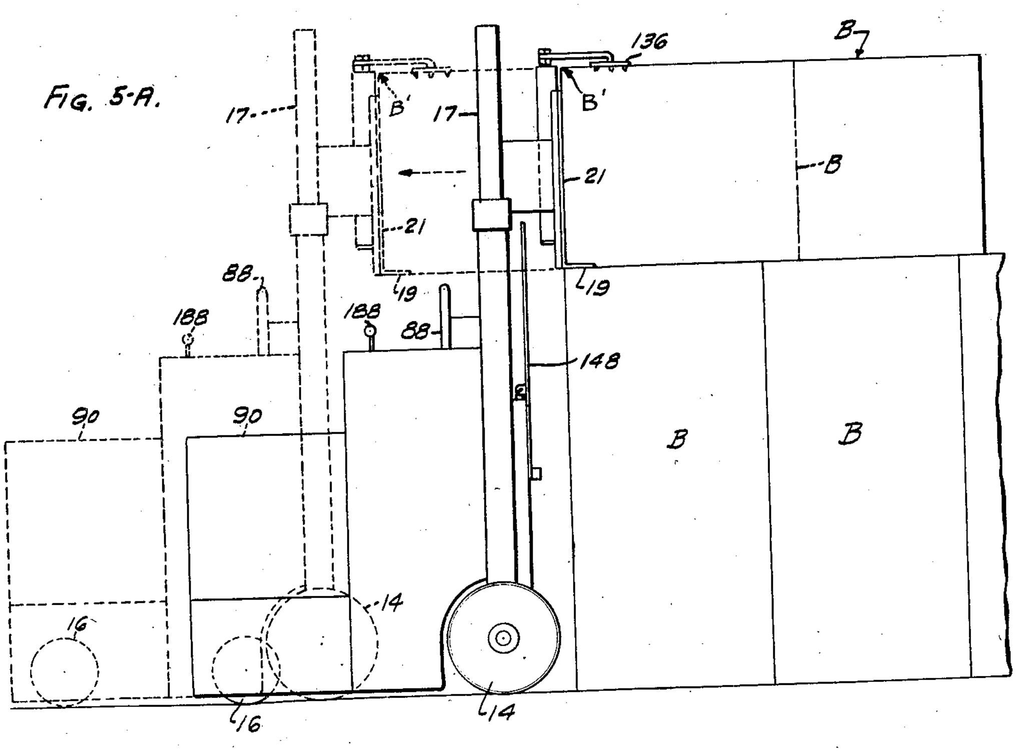
FIG. 5-B.
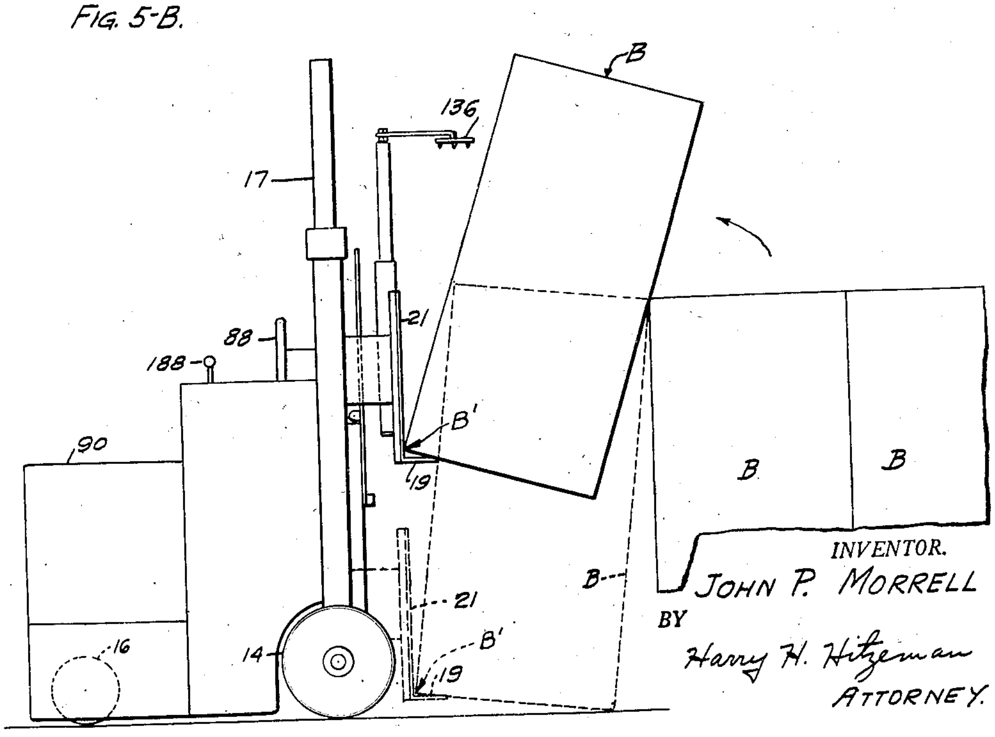
INVENTOR.
JOHN P. MORRELL
BY
Harry H. Hitzeman
ATTORNEY.

July 16, 1957

J. P. MORRELL
POWER DRIVEN MATERIAL HANDLING TRUCK
WITH STACKING MECHANISM 2,799,417

Filed Oct. 30, 1956

9 Sheets-Sheet 5

INVENTOR.
JOHN P. MORRELL
BY
Harry H. Hitzeman
ATTORNEY.

July 16, 1957

J. P. MORRELL
POWER DRIVEN MATERIAL HANDLING TRUCK WITH STACKING MECHANISM 2,799,417

Filed Oct. 30, 1956

9 Sheets-Sheet 6

INVENTOR.
JOHN P. MORRELL
BY
Harry H. Hitzeman
ATTORNEY.

INVENTOR.
JOHN P. MORRELL
BY
Harry H. Hitzeman
ATTORNEY.

INVENTOR.
JOHN P. MORRELL
BY Harry H. Hitzeman
ATTORNEY.

INVENTOR.
JOHN P. MORRELL
BY
Harry H. Hitzeman
ATTORNEY.

United States Patent Office
2,799,417
Patented July 16, 1957

2,799,417

POWER DRIVEN MATERIAL HANDLING TRUCK WITH STACKING MECHANISM

John P. Morrell, Wheaton, Ill.

Application October 30, 1956, Serial No. 619,205
15 Claims. (Cl. 214—514)

My invention relates to power driven material handling lift trucks and similar devices.

My invention relates more particularly to improvements in lift trucks of this general type provided with a clamping ram to provide a clamp to fasten an object between the lift fork assembly at its bottom and a vertically movable clamp element which is moved down against the top of an object so the same may be firmly gripped between the lift fork and the clamp.

Another feature of the present invention is the provision of a pivotally mounted pusher ram capable of use to pile or stack objects in a reclining position on a shelf or on top of a row of the same objects that have previously been vertically stacked. For example, in loading refrigerators or similar bulky objects into freight cars, the refrigerators are usually packaged in a rectangular cardboard carton or container with steel strapping about the same. The operator of the lift truck picks up the carton on the lift fork assembly, brings the clamp down on top of the carton to firmly hold the same between the lift fork assembly and the top clamp, and carries the carton to its destination in the freight car. After several cartons have been placed in alignment in the freight car, the next carton brought in is adapted to be raised adjacent the row of cartons, lifted so that the top is higher than the tops of the stacked cartons, and the clamp is then released permitting the carton to fall at an angle against the end carton. Next the pusher ram is used to move the carton up and forward in a horizontal plane on top of the row of vertical cartons to effect a stacking of horizontal cartons on top of the vertical cartons. The pusher ram is now retracted to inoperative position against the mast of the lift truck, the lift fork assembly and clamp are lowered, and the operator is ready to move another carton for final disposal either vertically or horizontally on a row of vertical cartons.

In unloading freight cars or in unloading from elevated surfaces, the lift truck is moved forward with the forks at the level of the surface on which the box or object is positioned, and the forks are pushed below the lower surface of the box that is lying in a horizontal position. The clamp is now brought down to firmly grasp the top of the box, and by moving the truck back away from the horizontal shelf or surface, the box to be unloaded is moved outwardly until it will fall over the edge of the horizontal surface by gravity. The clamp is then released from the top of the box and the fork lift is gradually lowered permitting the box to tilt over and slide down to the floor, being supported during its descent by the fork lift. After it has been lowered to a vertical position, the clamp is again brought down to grasp the upper surface of the box, it is raised from the floor, and the lift truck then carries it to a desired destination.

My invention therefore consists in the provision of a power driven lift truck having a lift fork assembly and a reciprocal clamp member associated therewith for holding a carton, box or other object at a desired height, releasing the clamp member to permit the box or object to fall at an angle against a row of boxes, and providing a pusher ram which can engage a lower edge of the tilted box and push it up and forward to a final disposition on top of a row of vertically aligned boxes.

My invention further contemplates the provision of the same power driven lift truck capable of grasping the upper and lower sides of a box or object that is lying on a shelf or other horizontal surface, pulling the same away from its position on the surface until the box or object will tilt by gravity, and then proceeding to lower the box or object to a vertical position on the floor, the box being supported during this transition from a horizontal to a vertical position by the lift fork under the lower edge of the same.

My invention further contemplates the provision in a lift truck of the type described of a single source of hydraulic power for the hydraulic rams of the lift fork assembly, the clamp member assembly and the pusher assembly, and a single central valve associated therewith capable of manipulation by the operator to effect a desired sequence of steps for effecting a proper loading action.

A further feature of the present invention is the provision for support of the truck frame and mast of a wheeled support structure including a pair of support and driving wheels in alignment with the mast and support and steering wheels at the rear of the storage battery support frame.

A further feature of the invention is the provision of a power plant and transmission for the driving wheels below the floor of the truck frame which supports the storage batteries, the same being suspended below the floor of the truck to require only a minimum of height, and to provide in a lift truck assembly of the type described one that can be turned about in a minimum of space.

Other features will be more apparent as the description proceeds, reference being also had to the accompanying drawings, wherein Fig. 1 is a front perspective view of a power driven material handling truck embodying my invention;

Figure 1:
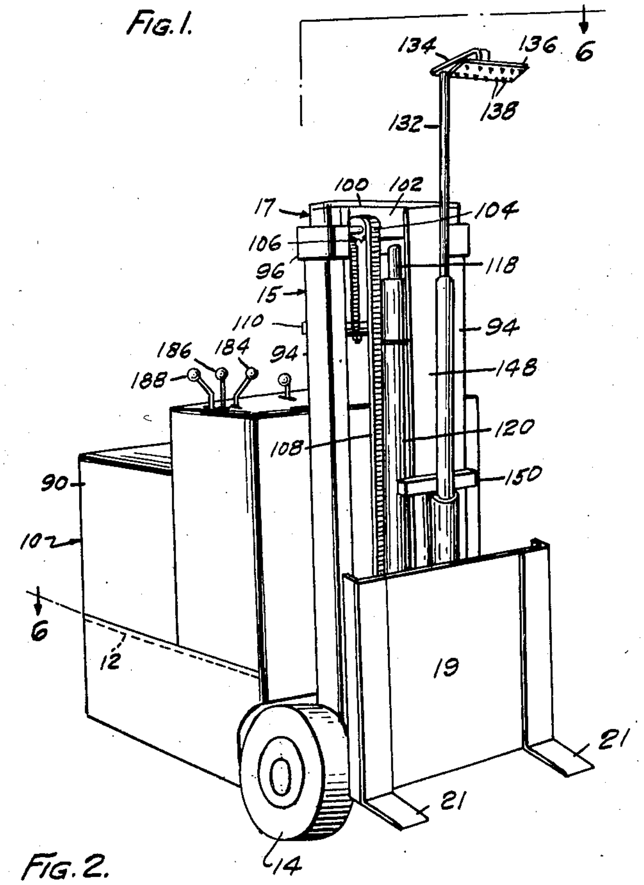
Figure 2:
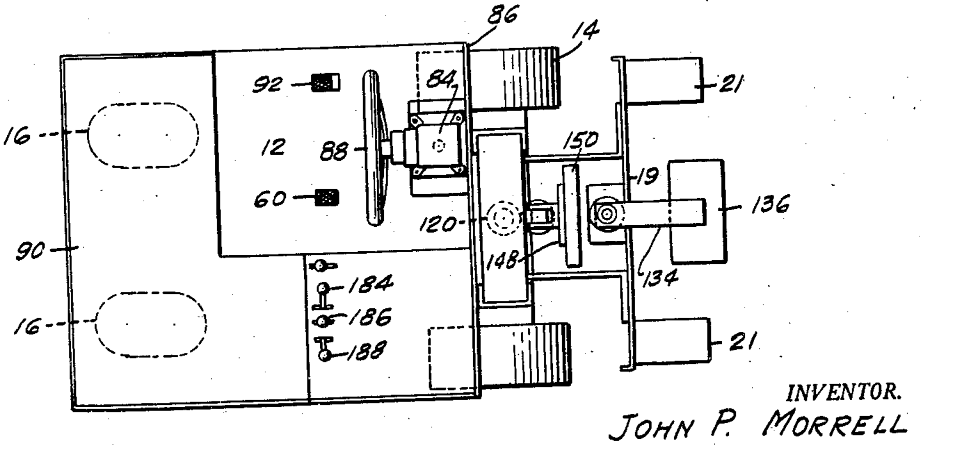
Fig. 2 is a plan view thereof.
Figure 3:
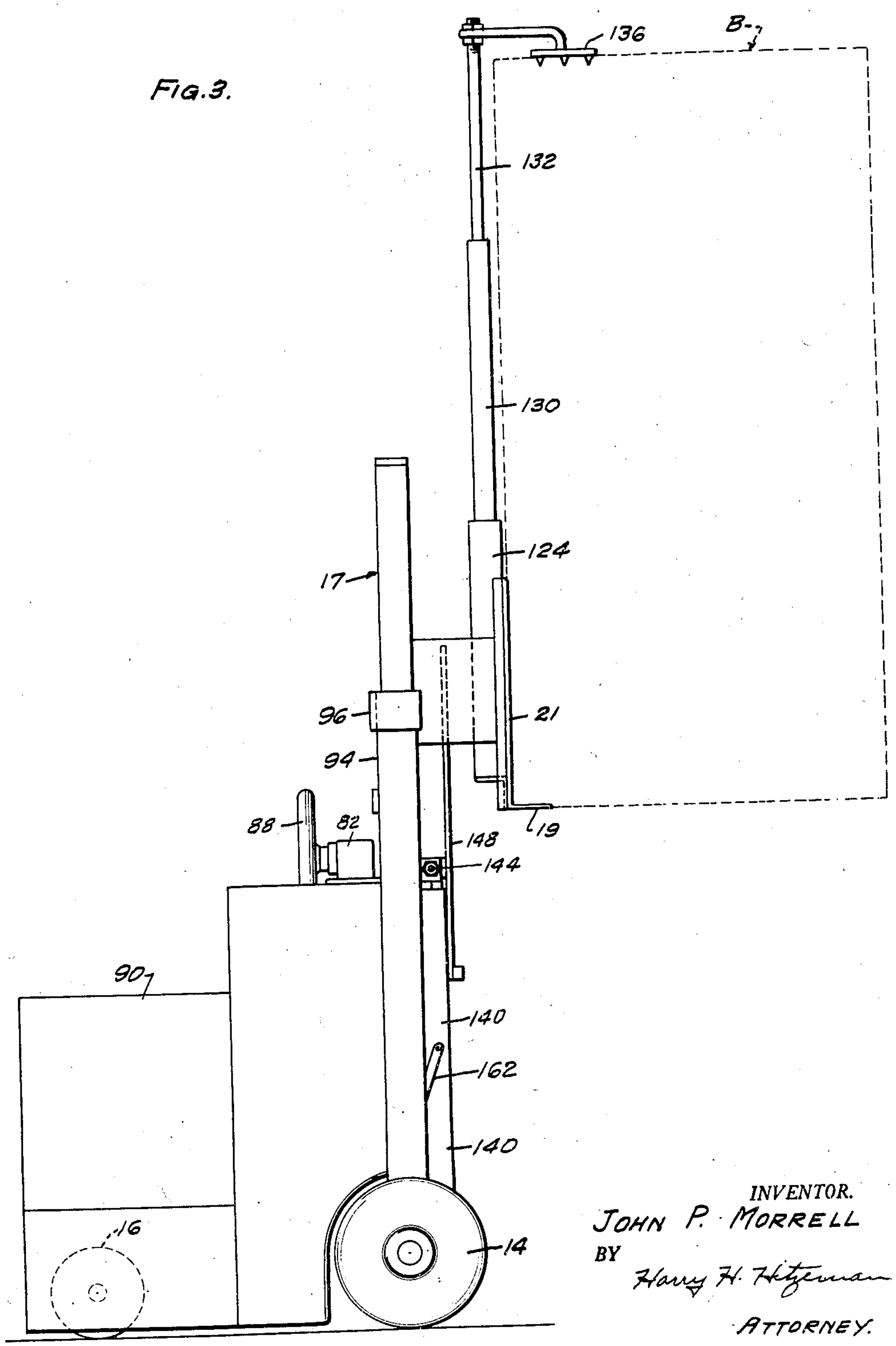
Fig. 3 is a side elevational view of the lift truck showing the lift fork assembly and clamping ram carried thereby in a raised position supporting an object, the object being shown in dotted lines.
Figures 4, 5:
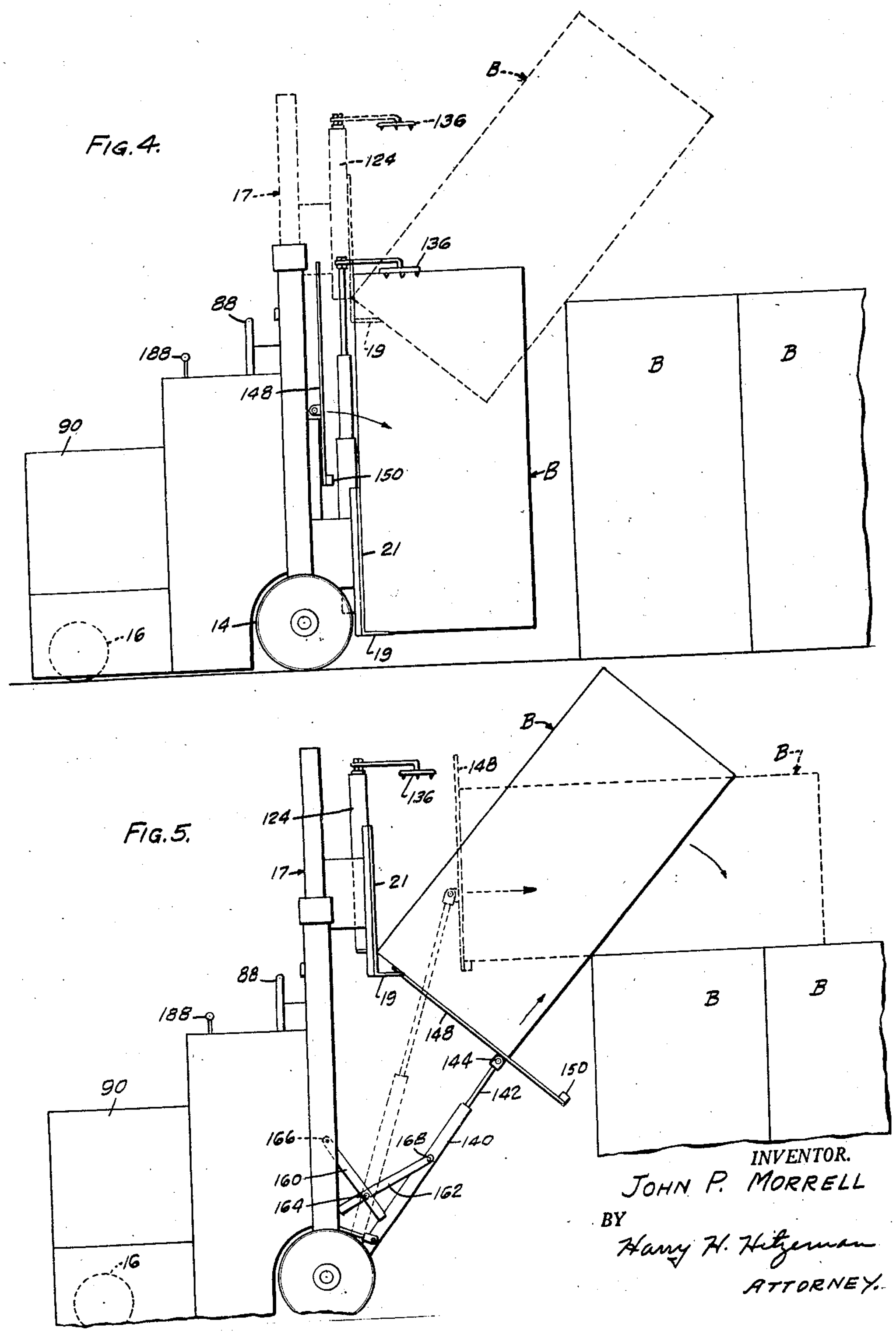
Figure 6:
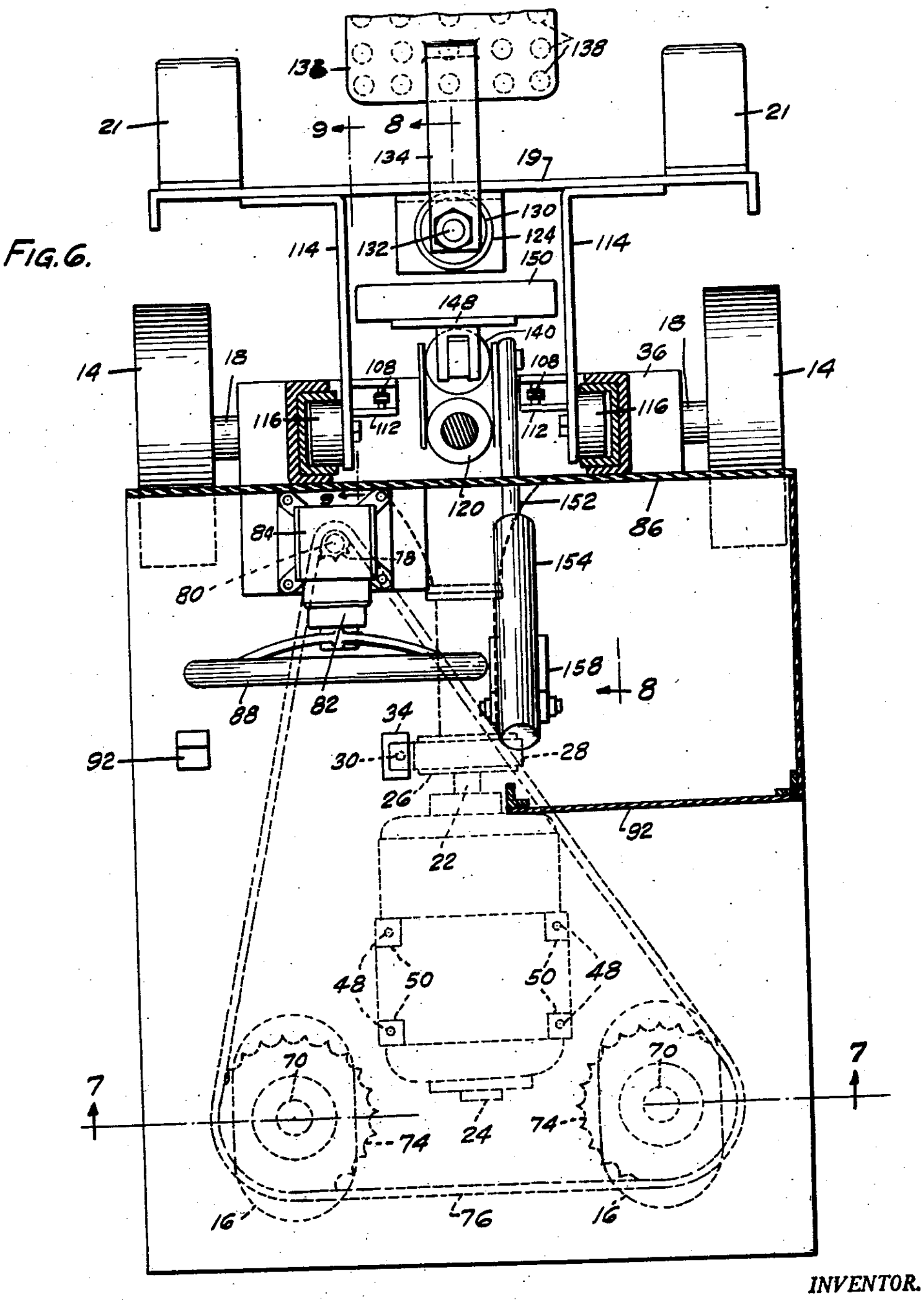
Figure 7:
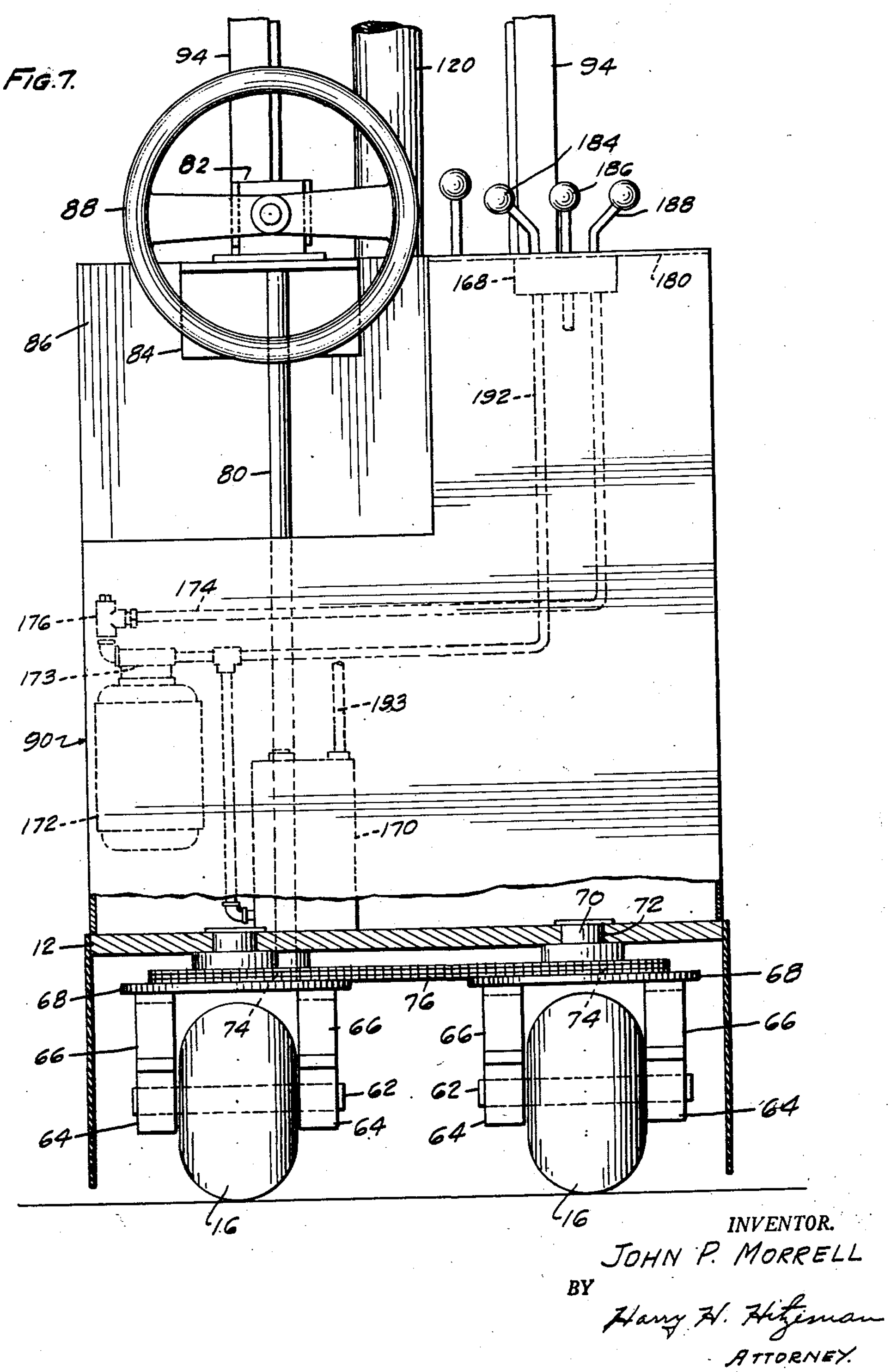
Figure 8:
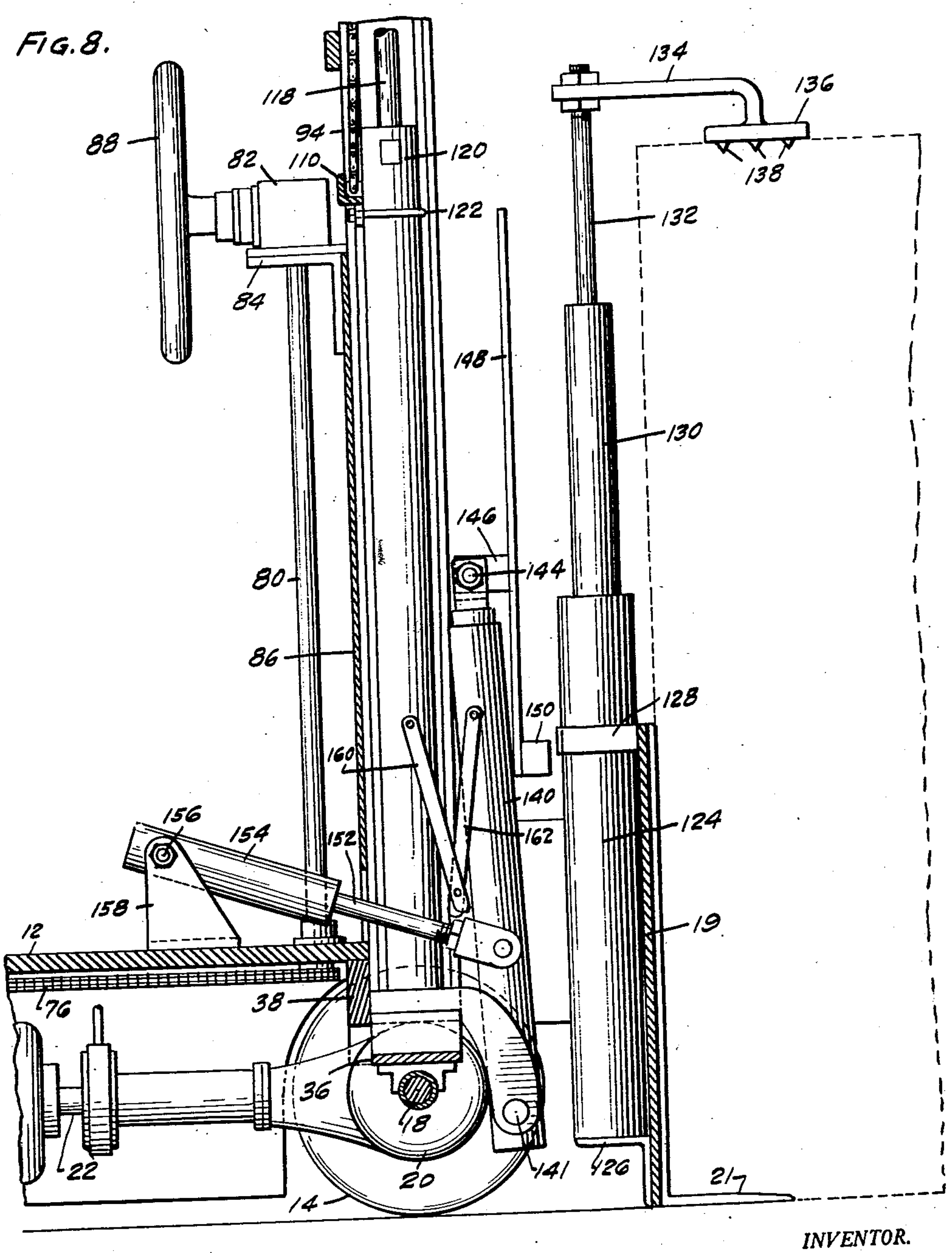
Figures 9, 11:
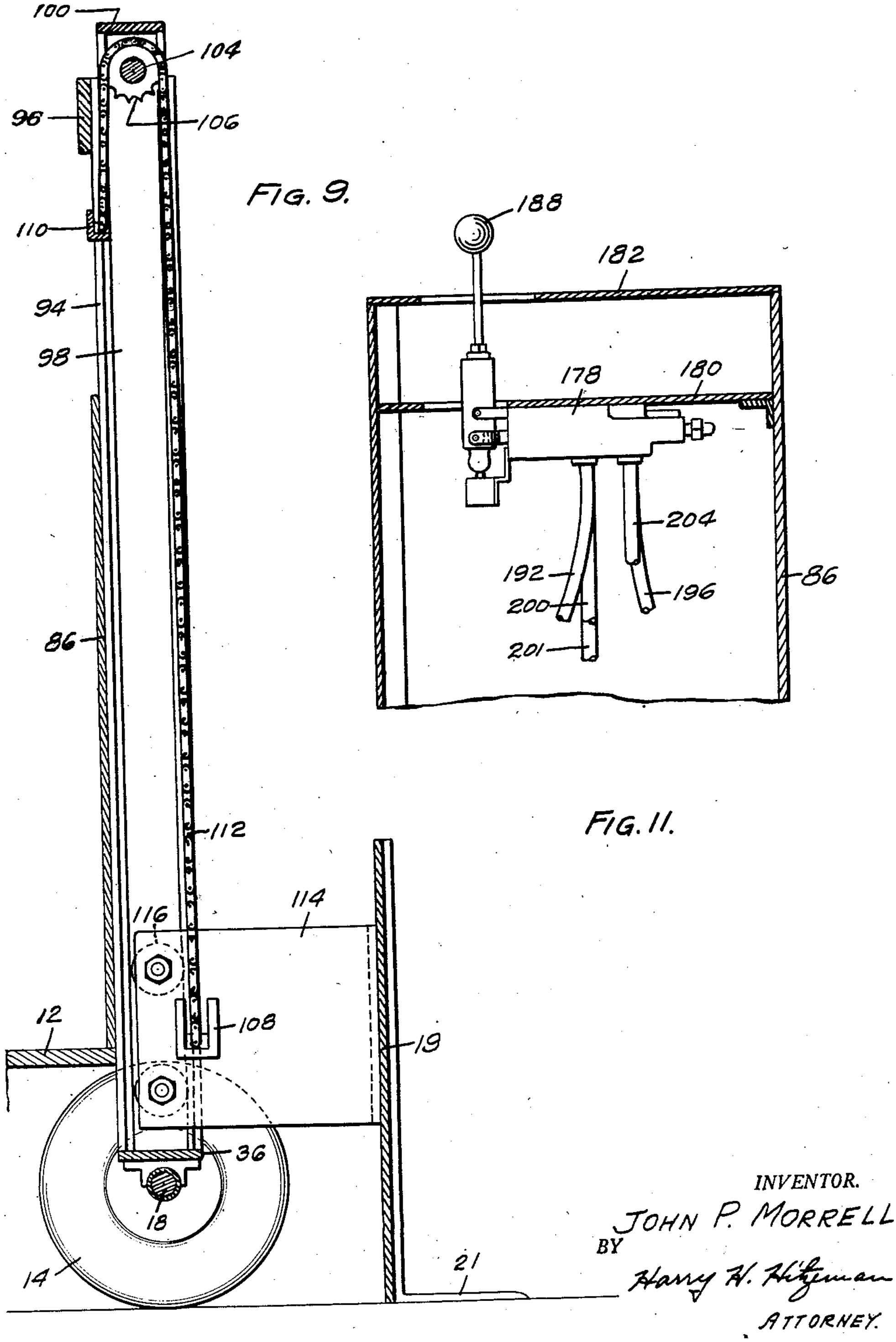
Figure 10:
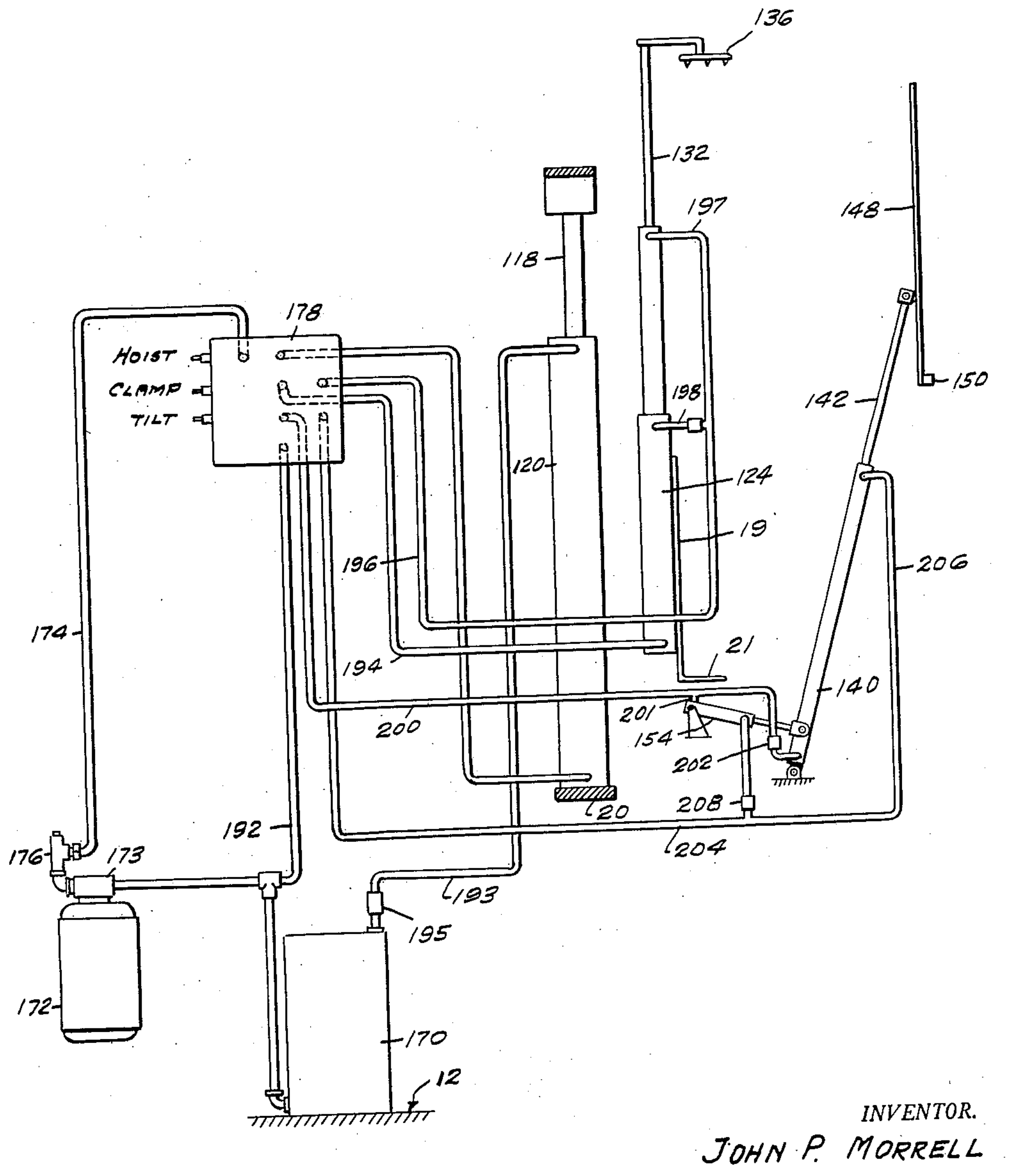

Fig. 4 is a similar side elevational view illustrating the manner in which boxes or cartons are carried forward and stacked in vertical alignment and then the next box or carton is shown being tilted to lie in a horizontal position on top of a row of vertically disposed boxes or cartons, the clamping ram and clamp being shown raised from the original position to release the hold on top of the box or carton and the lift fork assembly then raised to the dotted line position to show the box tilting operation;

Fig. 5 is a similar side elevational view of the lift truck showing the pusher ram and paddle moved out to a position below the tilted box in readiness to push the box forward and down to a horizontal position, the same pusher ram and paddle being shown in dotted lines after the box has been placed in a horizontal position to complete the pushing of the box forward upon the top of the vertical row of boxes;

Fig. 5–A is a side elevational view illustrating the manner in which boxes or cartons that are reclining on the top of a row of vertically disposed boxes or cartons may be grasped by moving the fork lift under the lower edge of the same, bringing the clamp down on the top and then moving the lift truck back away from the row of boxes to permit the box that is grasped to fall by gravity into a vertical position;

Fig. 5–B illustrates the manner in which the tilted box is gradually lowered to the floor by the fork lift assembly;

Fig. 6 is a plan sectional view taken generally on the line 6—6 of Fig. 1;

Fig. 7 is a transverse sectional view on the line 7—7 of Fig. 6 through the floor of the truck frame, showing the pivotally disposed support and steering wheels at the back of the truck, with parts broken in section to show other parts;

Fig. 8 is a fragmentary vertical cross-sectional view showing generally the location and positioning of the rams and associated parts and is taken generally on the line 8—8 of Fig. 6;

Fig. 9 is a fragmentary sectional view showing the connection of the fork lift plate and carriage to the mast and is taken generally on line 9—9 of Fig. 6;

Fig. 10 is a diagrammatic view showing the operation of the hydraulic directional control valve and its connection with the oil reservoir and the various rams; and Fig. 11 is a fragmentary sectional view showing the control valve and operating handles.

In the embodiment of the invention which I have chosen to illustrate and describe the same, the lift truck 10 may include the base platform or floor 12 which is supported by means of a pair of front wheel members 14 and rear wheel members 16. The front wheels 14 are mounted upon a pair of front axles 18 which extend from a differential 20, the differential 20 being connected by a drive shaft 22 coming from an electric motor 24. The shaft 22 is provided between the differential and the motor with a brake drum 26, the brake drum 26 having the usual brake band 28 operated by a lever 30 from a floor pedal 34. Thus a braking operation is effected by stepping on the pedal 34.

The motor 24 is mounted below the floor by suitable bolt members 48 which pass through spacer blocks 50 to support the motor spaced a short distance below the bottom of the floor 12 and in direct alignment with the differential 20.

The differential 20 is connected to a base plate member 36 which is fastened to a front plate 38 below the front edge of the floor 12, the plate 36 also serving as a support for the mast 15 and associated parts, as will be hereinafter more fully described.

The rear wheels 16 each have an axle 62 that is journaled in bearings 64 on both sides of the wheel, the bearings 64 being connected to a standard 66 which is provided upon its upper face with a disc 68. The disc 68 carries a king-pin assembly 70 mounted in an opening 72 in the floor, so that the wheels 16 may rotate about the king-pin 70 therein.

A sprocket wheel 74 may be fastened to the top of the disc 68 and a chain 76 may be trained about both of the sprockets 74 and a pinion sprocket 78 fastened to the lower end of a vertical shaft 80. The shaft 80 terminates at its upper end in a spiral miter gear unit 82 mounted upon a shelf 84 fastened to the front wall 86 of the truck frame. An angularly disposed stub shaft extends out of the housing of the gear unit 82 and is connected to a steering wheel 88. Thus when the steering wheel 88 is turned, it will rotate both of the back wheels 16 about the king-pin 70 and the truck may be moved backward or forward in a desired direction. The chain 76 is directly below the floor 12 of the frame assembly and passes over the motor 40 in the space provided by the spacer blocks 50.

The storage battery unit 90 may be generally L-shaped as shown, and is positioned on the floor 12 against the spacer wall 92, thus leaving a portion of the floor uncovered directly behind the steering wheel 88 and in the vicinity of the brake pedal 60. A "dead man" stop pedal 92 is also provided so that when the operator does not have his foot on the pedal 92, the entire mechanism is immobilized.

The operational mechanism of the lift truck may include the usual mast 15 which consists of a pair of facing channel members 94 mounted on the base plate 36 and connected at their upper ends by a cross-frame member 96. An elevator 17 equipped with a face plate 19 and lifting forks 21 is mounted for vertical movement within the mast 15 in a manner which will be more clearly explained hereinafter.

The elevator may include a pair of facing channel members 98 mounted for vertical reciprocation in the facing channels 94. The channels 98 are connected across the top by a plate 100 and directly below the same I provide a bracket 102 which supports a horizontally disposed shaft 104. A pair of sprockets 106 are mounted on the cross-shaft 104 and a pair of chains 108 are trained about sprockets 106. One end of each of the chains 108 is fastened to a cross-bar 110 connected between the channels 94 of the mast 15 and the other end of the sprockets 108 is connected to a bracket 112 mounted on the side of an angle member 114. The angle members 114 each carry a pair of rollers 116 that are confined within the parallel side walls of the channel members 98. The outer ends of the angle members 114 are fastened by welding or otherwise to the back of the face plate 19.

A piston rod 118 is connected at its upper end to the bracket 102 and positioned for reciprocal movement in a hydraulic cylinder 120 which is mounted on the base plate 20. The upper end of the cylinder 120 may also be connected by a U-shaped bolt member 122 to the cross-bar 110. An oil conduit for the introduction of hydraulic pressure is connected to the lower end of the cylinder 120 and when fluid under pressure is introduced it will raise the elevator 17 and face plate 19 in the usual manner.

As thus far described, the mechanism provides the usual type of forked lift truck that is generally known in the art. However, as previously pointed out, other functions besides the lifting and carrying of products from one place to another is desired, and for this reason I have also provided other mechanisms and other functions for operation therewith. In this connection I have provided a clamping mechanism for grasping the upper side of an article to be handled so that it can not easily fall or be pushed off the fork lift unit.

This mechanism may include a vertically disposed cylinder 124 that is mounted upon an angle-shaped platform member 126 fastened to the back of the fork plate 19. A strap 128 may fasten the same rigidly to the back of the plate member 19 adjacent the top of the plate member. The cylinder 124 may have a second cylinder 130 telescoped therein, the second cylinder having a third rod or ram member 132 telescopically disposed therein. An L-shaped arm 134 is fastened to the upper end of the rod 132 and carries a clamp plate 136 which is provided on its lower surface with a plurality of pointed gripping fingers 138. The cylinders 124 and 130 are connected by the hydraulic conduits at their upper and lower ends to the hydraulic system later to be described.

In the system, as desired, oil is introduced either at the top or the bottom of the cylinder 126 to raise or to lower the ram 132. If higher boxes are to be handled, the second ram 130 is also raised. Thus when the clamp plate 136 is raised, the lift truck may be moved forward to slide the fork members 21 under the base of a box or other object, and then the clamp 136, which has previously been raised, is lowered to secure a firm grip on top of the box or other object to be moved.

To provide a mechanism for tilting and laying an object such as a box or carton on its side, as generally shown in Figs. 4 and 5 of the drawings, the object such as the box or carton B is picked up on the fork 19, the clamp 136 is brought down to rigidly hold the box between the fork 19 and the clamp 136. It is then raised a slight distance and the truck carries the box B to its destination which, as shown in Fig. 4, may be against the side of a row of boxes B that have previously been loaded, for example, into a freight car for shipment.

The box B is now raised generally to the position shown in Fig. 4, the clamp 136 is raised from the top of the box B, and the box will fall to the position shown in dotted lines in Fig. 4, with the lower end of the box being supported by the fork members 19. A second ram provided with a pusher element is now brought into use. This ram assembly may include a cylinder 140 that is mounted at its lower end on a pair of pivots 141 fastened on straps 41 connected to the top of the base plate 36 and extending down in front of the differential 20. The cylinder 140, which is in alignment with the cylinder 120, carries a rod 142 that is telescopically mounted therein for reciprocal movement. The rod 142 has a pivot 144 at its upper end and a U-shaped bracket 146 is mounted on said pivot. The bracket 146 is fastened to the back of a vertically disposed plate or paddle 148 which carries a cross-bar 150 at its lower end. The cross-bar 150 is sufficiently heavy so that it normally holds the paddle 148 in a vertical position by gravity. Thus when cylinder 140 is retracted as shown in Fig. 8, the paddle hangs vertically suspended against the cylinder 140 out of the path of face plate 19 and associated parts. Oil conduits 200 and 206 are connected to the upper and lower ends of the cylinder 140 for raising or lowering the rod 142 therein.

Means for swinging the ram or cylinder 140 about its pivotal mounting 141 may include a rod 152 pivotally connected at its end to a pin 153 fastened to the side of the cylinder 140. The rod 152 is mounted for reciprocal movement in a cylinder 154 that is pivotally mounted on a pin 156 carried by a U-shaped bracket 158 mounted on the floor 12 of the frame. The cylinder 154 may have oil conduits 200 and 201 connected to each end of the same and to a hydraulic system later to be described.

The pusher ram is adapted to be employed when the disposition of a box or carton is in the stage of operation shown in Fig. 4. With the fork lift 19 in the position shown in dotted lines in Fig. 4, oil is now introduced through the conduit 208 into the end of cylinder 154 and the ram 140 is swung outwardly generally to the position shown in full lines in Fig. 5. In this position oil is now introduced through the conduit 194 in the lower end of the ram 140 and the plate 148 is moved forward so that it is thrust against the bottom of the box B, and continued forward movement of the rod 142 and plate 148 will push the box upward until it falls to a horizontal position as shown by dotted lines in Fig. 5.

In this condition of the box B, the rod 142 is now raised in the ram 140 and the plate 148 assumes the dotted line position shown in Fig. 5, and by moving the truck assembly forward the Box B is pushed forward completely on the top of the row of vertical boxes B. After this has been done, the rod 142 is moved in the reverse direction so that the plate 148 may assume a vertical position about its pivot 144, and by directing oil through the conduit 210 into the oppositse end of cylinder 154, the ram 140 is drawn back to its vertical position adjacent the cylinder 120. With the vertical cylinders thus aligned, the fork lift plate 19 and forks 21 may now be lowered to the position shown in Fig. 1 and the truck may be moved forward to receive the next box B to be transported. The ram 140 is supported in extended position by a set of link members 160 and 162 pivoted together at 164 and pivotally connected at 166 and 168 to the sides of the cylinders 120 and 140 respectively.

The hydraulic system which I have provided may be of the usual type having an oil reservoir 170 positioned on the floor 12 of the truck assembly, and an electric motor and hydraulic pump assembly 172 fastened to the front panel 86 of the truck frame assembly. An oil conduit 174 may lead from the pump 173 through a check valve 176 to the pressure inlet port of the main control valve 178 fastened to a support plate 180 below the top 182 of the frame assembly, the operating levers 184, 186 and 188 being adapted to extend through slots in the cover and being provided on their ends with ball handles for easy manipulation.

By moving the operating lever 184 forward, which is the lever that controls the operation of the main elevator ram 120, oil under pressure flows through line 190 to the bottom of the ram 120 to raise the rod 118, and through the mechanism shown raise the face plate 19 and fork lift 21. To lower the same, the lever 184 is pulled back, permitting oil to return through the line 192 to the reservoir 170. A bleeder line 193 from the top of the ram 120 may also extend directly to the reservoir 170, the main elevator and face plate descending normally under its own weight when the lever 184 is operated to a lowering position.

The lever 186 controls the flow of oil under pressure through line 194 to the bottom of the cylinder 124 to raise the plunger 132 first and next the plunger 130, to raise the clamp 136 to a desired level. To lower the clamp, the lever 186 is moved back and oil under pressure is directed through line 196 which first enters the top of cylinder 130 through line 197 to lower the rod 132, and after this has been done it lowers the cylinder 130 through oil pressure directed through line 198.

To operate the pusher plate and to tilt the ram 140, oil is directed from the control valve 178 through the line 200. Oil will first enter the by-pass line 201 entering the back end of the cylinder 154 to move the cylinder 140 to an angular position. Oil then continues to flow through the line 200 through a restrictor 202 into the bottom of the cylinder 140 to raise the plunger 142 to a desired position.

After a box or carton has been stacked in a horizontal position as hereinbefore described, the lever 188 is pulled back and oil is directed to the top of cylinder 140 through the lines 204 and 206 to return the rod 142 to a down position. After this has been done continued flow of oil through the line 204 will pass through the restrictor 208 and the line 210 into the front end of the cylinder 154 to swing the ram 140 back to a vertical position.

From the above and foregoing description, it can be seen that I have provided a hydraulic lift truck which is unique in many features and which is capable of performing operations which have hithertofore been performed manually. As the invention has been described, the lift truck which I have provided is capable of picking up a box or carton, raising it to a desired level, then tilting the same and pushing it into a horizontal position on top of a shelf or other support. By the provision of a single main control valve through which all of the oil lines are directed, it can be seen that no confusion can result in the operation of the various rams, since only one is capable of operation at a time. With the controls shown, it is therefore a simple matter to raise a box or carton on the fork lift, release the clamp from the top of the same, raise the face plate if necessary to permit the pusher plate to be swung out, and then move the pusher plate against the bottom edge of the box or carton and push the same into final position.

When it is desired to unload a freight car or to remove boxes or similar objects from a shelf or other horizontal surface, the lift truck is moved forward as shown in Fig. 5–A and the forks 21 are pushed below the bottom surface of the box and the clamp 136 is brought down to grasp the top surface of the box. The truck is now moved back from the edge of aligned boxes or other horizontal shelf, as shown in dotted lines in Fig. 5–A, until the box that has been grasped is pulled far enough off the shelf so that it will tilt by gravity.

The clamp 136 is now released from the top surface of the box and by backing the lift truck away a little further the box will tilt by gravity and the edge will slide down against the face plate until the edge B′ rests on the forks 21. The lift fork and plate can now be slowly lowered as the box slides down from its own weight until one edge of the box rests on the floor. The fork is then moved back away to permit the box to rest on its lower surface. It can now be picked up in the manner previously described between the fork lift and the clamp and be moved to a desired destination.

I contemplate that changes and variations may be made in the exact details shown and I do not wish to be limited in any particular; rather what I desire to secure and protect by Letters Patent of the United States is:

1. The combination with a hydraulic lift truck of the type having a face plate and fork lift and a clamping means associated with said face plate and fork lift for grasping an object and raising the same to a desired height, of means for tilting and pushing said object into a desired position on a raised surface, said means including a ram pivoted adjacent the base of said lift truck, means for swinging said pivoted ram outwardly to a desired angle, a rod reciprocal in said ram, and a pusher plate pivotally secured to the end of said rod, said pusher plate having a transverse cross-bar at its bottom end for engaging below the edge of an object for tilting and pushing the same.

2. The combination with a power driven hydraulic lift truck of the type having a face plate and fork lift and a clamping means associated with said face plate and fork lift for grasping an object below and above the same and raising it to a desired height in a vertical plane, of means for pushing said object into a desired position on a raised surface, said means including a ram pivoted adjacent the base of said lift truck, means for moving said pivoted ram outwardly to a desired angle, a pusher rod in said ram reciprocal under oil pressure therein, and a pivotally mounted pusher plate secured to the end of said rod, said pusher plate having a transverse cross-bar at its bottom end for engaging below the edge of an object for tilting and pushing the same, said pusher plate engaging the base of the object after it has been tilted to a horizontal position and forward pushing of the object being accomplished by moving the lift truck forward with the pusher plate in this position.

3. The combination with a power driven hydraulic lift truck of the type having a face plate and fork lift and a clamping means associated with said face plate and fork lift for grasping an object below and above the same and raising it to a desired height in a vertical plane, of means for pushing said object into a desired position on a raised surface, said means including a ram pivoted adjacent the base of said lift truck, means for moving said pivoted ram outwardly to a desired angle, a pusher rod in said ram reciprocal under oil pressure therein, and a pivotally mounted pusher plate secured to the end of said rod, the means for moving said ram upwardly and outwardly including a reciprocating plunger mounted on said lift truck and pivotally connected to said ram, said pusher plate having a transverse cross-bar at its bottom end for engaging below the edge of an object for tilting and pushing the same, said pusher plate engaging the base of the object after it has been tilted to a horizontal position and forward pushing of the object being accomplished by moving the lift truck forward with the pusher plate in this position.

4. The combination with a power driven hydraulic lift truck of the type having a face plate and fork lift and a clamping means associated with said face plate and fork lift for grasping an object below and above the same and raising it to a desired height in a vertical plane, of means for pushing said object into a desired position on a raised surface, said means including a ram pivoted adjacent the base of said lift truck, means for moving said pivoted ram outwardly to a desired angle, a pusher rod in said ram reciprocal under oil pressure therein, and a pivotally mounted pusher plate secured to the end of said rod, the means for moving said ram upwardly and outwardly including a reciprocating plunger mounted on said lift truck and pivotally connected to said ram, said reciprocating plunger and said pusher rod movable in both directions by fluid pressure from a single source.

5. The combination with a power driven hydraulic lift truck of the type having a face plate and fork lift and a clamping means associated with said face plate and fork lift for grasping an object below and above the same and raising it to a desired height in a vertical plane, of means for pushing said object into a desired position on a raised surface, said means including a ram pivoted adjacent the base of said lift truck, means for moving said pivoted ram outwardly to a desired angle, a pusher rod in said ram reciprocal under oil pressure therein, a pivotally mounted pusher plate secured to the end of said rod, the means for moving said ram outwardly including a reciprocating plunger mounted on said lift truck and pivotally connected to said ram, said reciprocating plunger and said pusher rod movable in both directions by fluid pressure from a single source, and a single control valve for selectively directing said fluid pressure to said pusher rod or to said ram actuating plunger.

6. In combination, a power driven hydraulic lift truck having a front mast, an elevator, a ram for moving said elevator, a face plate and fork lift carried by said elevator, clamping means associated with said face plate and fork lift for grasping an object and raising the same to a desired height, said clamping means including a ram fastened to the back of said face plate, a reciprocating plunger in said ram, a clamp member fastened to the top of said plunger, said clamp member extending forward therefrom and overlying said fork lift, means for pushing said object into a desired position on a raised surface, said means including a ram pivoted adjacent the base of said lift truck, means for swinging said pivoted ram outwardly to a desired angle, a rod reciprocal under oil pressure in said ram, and a pusher plate secured to the end of said rod, said pusher plate having a transverse cross-bar secured to its lower end of sufficient weight to swing said pusher plate to a vertical plane by gravity.

7. In combination, a power driven hydraulic lift truck having a front mast, an elevator, a ram for moving said elevator, a face plate and fork lift carried by said elevator, clamping means associated with said face plate and fork lift for grasping an object and raising the same to a desired height, said clamping means including a ram fastened to the back of said face plate, a reciprocating plunger in said ram, a clamp member fastened to the top of said plunger, said clamp member extending forward therefrom and overlying said fork lift, means for pushing said objects into a desired position on a raised surface, said means including a ram pivoted adjacent the base of said lift truck, means for swinging said pivoted ram outwardly to a desired angle, a rod reciprocal under oil pressure in said ram, and a pusher plate secured to the end of said rod, the means for moving said ram outwardly including a reciprocating plunger mounted on said lift truck and pivotally connected to said ram, said pusher plate having a transverse cross-bar secured to its lower end of sufficient weight to swing said pusher plate to a vertical plane by gravity.

8. In combination, a power driven hydraulic lift truck having a front mast, an elevator, a ram for moving said elevator, a face plate and fork lift carried by said elevator, clamping means associated with said face plate and fork lift for grasping an object and raising the same to a desired height, said clamping means including a ram fastened to the back of said face plate, a reciprocating plunger in said ram, a clamp member fastened to the top of said plunger, said clamp member extending forward therefrom and overlying said fork lift, means for pushing said object into a desired position on a raised surface, said means including a ram pivoted adjacent the base of said lift truck, means for swinging said pivoted ram outwardly to a desired angle, a rod reciprocal under oil pressure in said ram, and a pusher plate secured to the end of said rod, the means for moving said ram outwardly including a reciprocating plunger mounted on said lift truck and pivotally connected to said ram, said reciprocating plunger and said pusher rod movable in both directions by fluid pressure from a single source.

9. In combination, a power driven hydraulic lift truck having a front mast, an elevator, a ram for moving said elevator, a face plate and fork lift carried by said elevator, clamping means associated with said face plate and fork lift for grasping an object and raising the same to a desired height, said clamping means including a ram fastened to the back of said face plate, a reciprocating plunger in said ram, a clamp member fastened to the top of said plunger, said clamp member extending forward therefrom and overlying said fork lift, means for pushing said object into a desired position on a raised surface, said means including a ram pivoted adjacent the base of said lift truck, means for swinging said pivoted ram outwardly to a desired angle, a rod reciprocal under oil pressure in said ram, and a pusher plate secured to the end of said rod, the means for moving said ram outwardly including a reciprocating plunger mounted on said lift truck and pivotally connected to said ram, said reciprocating plunger and said pusher rod movable in both directions by fluid pressure from a single source, and a single control valve for selectively directing said fluid pressure to said pusher rod or to said ram actuating plunger.

10. A power driven lift truck including a horizontally disposed floor having a vertical mast mounted at the front end of the same, a horizontal axle at the front of said vertical mast, a pair of front wheels at the ends of said axle, a similar pair of wheels mounted adjacent the back of said floor, said back wheels each having a mounting assembly including a king-pin positioned for rotation in the floor of said lift truck, a steering wheel adjacent said vertical mast, a vertically disposed shaft extending through the floor from said steering wheel, a pinion on the end of said shaft, sprockets on the mounting assembly of each of said back wheels, a chain trained about said sprockets and said pinion, said vertical mast having an elevator operable therein, a face plate carried thereby, lift forks at the lower end of said face plate, a hydraulic ram fastened to the back of said face plate, and a clamping member attached to the upper end of said ram, said clamping member capable of up and down movement to grip or release an object positioned on said fork lift.

11. A power driven lift truck including a horizontally disposed floor having a vertical mast mounted at the front end of the same, a horizontal axle at the front of said vertical mast, a pair of front wheels at the ends of said axle, power means below said floor for driving said front wheels, a similar pair of wheels mounted adjacent the back of said floor, said back wheels each having a mounting assembly including a king-pin positioned for rotation in the floor of said lift truck, a steering wheel adjacent said vertical mast, a vertically disposed shaft extending through the floor from said steering wheel, a pinion on the end of said shaft, sprockets on the mounting assembly of each of said back wheels, a chain trained about said sprockets and said pinion, said vertical mast having an elevator operable therein, a face plate carried thereby, lift forks at the lower end of said face plate, a hydraulic ram fastened to the back of said face plate, and a clamping member capable of up and down movement to grip or release an object positioned on said fork lift.

12. A power driven hydraulic lift truck including a horizontally disposed floor having a vertical mast mounted at the front end of the same, a horizontal axle at the front of said vertical mast, a pair of front wheels at the ends of said axle, a similar pair of back wheels mounted adjacent the back of said floor, said back wheels each having a mounting assembly including a king-pin positioned for rotation in the floor of said lift truck, a steering wheel adjacent said vertical mast, a vertically disposed shaft extending through the floor from said steering wheel, a pinion on the end of said shaft, sprockets on the mounting assembly of each of said back wheels, a chain trained about said sprockets and said pinion, said vertical mast having an elevator operable therein, a face plate carried thereby, lift forks at the lower end of said face plate, a hydraulic ram fastened to the back of said face plate, a clamping member attached to the upper end of said ram and capable of up and down movement to grip or release an object positioned on said fork lift, a motor below said floor, a drive shaft therefrom, a differential, a drive from said drive shaft to said differential, a pair of sprockets driven by said differential, pinion sprockets on said front wheels and a chain drive from said sprockets to said pinion sprockets.

13. The method of automatically stacking rectangularly shaped objects on an elevated horizontal surface, which consists in using a power operated fork lift truck to carry the same to a point adjacent the edge of an elevated horizontal surface, raising the object to be stacked to a height so that the top of the same is higher than the horizontal elevated surface by at least half the height of the object, releasing the grip of the gripper arm on the top of the object to permit the object to fall forward and come to rest against the edge of the elevated surface at an angle with the object now supported at a bottom corner by the forks of the lift truck, using an extensible ram pivotally mounted on the lift truck below the fork lift to engage the bottom side of the object to push the same upwardly and forwardly at an angle over the edge of the elevated horizontal surface until the object falls on its side by gravity on the elevated surface, and then moving the ram up to engage the edge of the entire bottom surface of the object which is now in a vertical plane, holding the ram rigid in this position extending upwardly and forwardly from the lift truck, and then moving the lift truck forward to move the rectangularly shaped object now lying on its side on the elevated horizontal surface forward until its bottom side is moved forward so that it is aligned with the side edge of the elevated surface.

14. The method of automatically stacking rectangularly shaped objects on an elevated horizontal surface, which consists in using a power operated fort lift truck to grip a rectangularly shaped object between the forks of the lift truck and a gripper arm brought down on the top of the object and carry the same to a point adjacent the edge of an elevated horizontal surface, raising the object to be stacked to a height so that the top of the same is higher than the horizontal elevated surface by about half the height of the object, releasing the grip of the gripper arm on the top of the object to permit the object to fall forward and come to rest against the edge of the elevated surface at an angle with the object now supported at a bottom corner by the forks of the lift truck, using an extensible ram pivotally mounted on the lift truck below the fork lift to engage the bottom side of the object to push the same upwardly and forwardly at an angle over the edge of the elevated horizontal surface until the object falls on its side by gravity on the elevated surface, and then moving the ram up to engage the edge of the entire bottom surface of the object which is now in a vertical plane, holding the ram rigid in this position extending upwardly and forwardly from the lift truck, and then moving the lift truck forward to move the rectangularly shaped object now lying on its side on the elevated horizontal surface forward until its bottom side is moved forward so that it is aligned with the side edge of the elevated surface.

15. The method of automatically unloading a rectangularly shaped object lying on its side on an elevated horizontal surface which consists of moving a power operated lift truck having a vertically movable lift fork with a vertically movable clamp thereon forward to grip the upper and lower edges of the facing bottom side of the same between the lift fork and the clamp, pulling the rectangularly shaped object away from the edge of the horizontal surface on which it is lying until the object can tilt by gravity toward a vertical plane, releasing the clamp from the upper edge of the facing bottom side of the object and permitting the object to be lowered to rest upon its bottom side by lowering the fork lift as the object is tilted until the object rests upon its bottom side in a vertical plane, then lifting up the object by moving the lift fork under the edge of the bottom side of the same and the clamp down upon the top side of the object and moving it with the lift truck to a desired destination.

References Cited in the file of this patent

UNITED STATES PATENTS

| | | |
|---|---|---|
| 1,149,250 | Davis | Aug. 10, 1915 |
| 1,556,262 | Streeter | Oct. 6, 1925 |
| 2,412,155 | Jessen | Dec. 3, 1946 |
| 2,578,802 | Heidrick et al. | Dec. 18, 1951 |
| 2,684,773 | Boyles | July 27, 1954 |